Patented Oct. 15, 1946

2,409,277

UNITED STATES PATENT OFFICE 2,409,277

PLASTICIZED POLYCHLOROPRENE

Mortimer T. Harvey, South Orange, N. J., assignor to The Harvel Corporation, a corporation of New Jersey No Drawing. Application June 27, 1944, Serial No. 542,438

6 Claims. (Cl. 260—36)

This invention relates to novel compositions of matter and to methods for preparing the same. More particularly the invention is directed to novel rubbery compositions including a so-called synthetic rubbery material commonly known as "neoprene" and being a solid rubbery polymer of 2-chlor butadiene.

In one of its more specific aspects the invention is directed to the novel combination of "neoprene" and a plasticizer therefor of an hydrocarbon ether of an anacardic material or the thickened products obtained by heating said ethers. Examples of these plasticizers are the methyl, ethyl, propyl, butyl, amyl, secondary propyl, secondary butyl, secondary amyl, tertiary butyl, tertiary amyl, phenyl, benzyl and allyl ethers of anacardic materials and also the thickened products produced by heating said ethers. These ethers may be prepared by heating a mixture of the anacardic material, the ester of the desired hydrocarbon and an alkali metal hydroxide and the general methods for preparing the hydrocarbon ethers of an anacardic material are disclosed in the patents to S. Caplan No. 2,181,119, of November 28, 1939, and 2,240,034, of April 29, 1941, and in the copending application of M. T. Harvey and S. Caplan, Serial No. 541,580, filed June 23, 1944, and reference is hereby made thereto.

These ethers may be thickened by heating the same in air, vacuum or in the presence of an inert gas, such as $CO_2$ and in the substantial absence of free oxygen, or in the presence of a peroxide such as benzoyl peroxide may be added thereto to speed up the thickening. In factory practice temperatures between about 500° F. and 650° F. are preferably employed for this purpose.

By the term "anacardic material" as used in this description and the claims, is meant either cashew nut shell liquid or a distillate from cashew nut shell liquid, which distillate is chiefly a phenol having an unsaturated hydrocarbon substituent containing more than 13 carbon atoms.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the U. S. Patent to E. R. Hughes, 2,058,456, of October 27, 1936, or it may be the so-called treated cashew nut shell liquid obtained after the raw cashew nut shell liquid has been treated to reduce its vesicant action and to remove the naturally occurring metals therein as set forth in the patent to Harvey, No. 2,128,247, of August 30, 1938, and to Harvey-Damitz, No. 2,067,919, of January 19, 1937, to which reference is hereby made, or it may be either the raw or treated cashew nut shell liquid which has been steam distilled or distilled under vacuum at about 550° F.–600° F. to remove the more volatile constituents which measure about 5% by weight of the liquid treated.

The distillate from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled at between 600° F.–700° F. or distilled at 525° F.–700° F. under reduced pressure of about 50 mm. of mercury or at about 450° F. under reduced pressure of 10 mm. of mercury. By whatever method employed, the distillation is continued until the quantity by weight of the distillate is between about 25% to about 75% of the quantity by weight of the cashew nut shell liquid. The distillate thus obtained for the most part consists of a phenol having an unsaturated hydrocarbon substituent having more than 13 carbon atoms and having a boiling point of approximately 225° C. at 10 mm. of mercury pressure.

According to this invention, these hydrocarbon ethers as well as the heat thickened products thereof act as excellent plasticizers for "neoprene" and to lower the Shore hardness and also to improve the ageing and elongation characteristics of the cured product. It has been further found that the presence of these plasticizers will not to any material degree disadvantageously affect the curing or vulcanization of the stock. The proportion by weight of the "neoprene" to said ethers and the heat thickened products thereof may be between 100 parts of "neoprene" to 5 parts of said plasticizer and 100 parts of "neoprene" to 100 parts of said plasticizer.

Novel and improved millable compositions and cured compositions may be obtained by adding one or a combination of two or more of said hydrocarbon ethers of an anacardic material or said heat thickened products thereof to "neoprene." Generally speaking, this addition may be made in the same manner in which other plasticizers have been heretofore employed with said "neoprene." For example, a quantity of the "neoprene" is masticated on a differential speed roll mill, the rolls of which are maintained at temperatures of 100°–120° F. and in the course of this mastication there is gradually added thereto one or more of said hydrocarbon ethers of anacardic material or the heat thickened products thereof. Milling is continued until there is an intimate mixture of the "neoprene" and said ether. After this intimate mixture has been obtained, it may be stripped off the rolls as sheets and then cured. If desired, a quantity of a vulcanizing agent, accelerator and/or reinforcing material as well as other material used in the compounding of "neoprene" may be added to said mixture and dispersed therethrough on said rubber mill either before, during or after the addition of the ether of the anacardic material thereto. After milling the stock may be cured to provide cured soft stock having excellent ageing and elongation characteristics.

The invention accordingly comprises the several steps and the relation of one or more of such steps with respect to each of the others, and compositions of matter possessing the characteristics, properties and relation of components, all of which will be exemplified in the following detailed disclosure, and the scope of the invention will be indicated in the claims.

For a fuller understanding of the invention, reference should be had to the following examples which are given to illustrate further the invention and are not to be construed in a limiting sense, all parts being given by weight, unless otherwise indicated.

*Example 1*

A mixture made up of the following, in parts by weight indicated by the corresponding figures, was milled together on a rubber mixing mill or rolls:

| | Parts |
|---|---|
| "Neoprene GRM" | 100 |
| "Neozone D" (accelerator) | 2 |
| Zinc oxide | 5 |
| Magnesium carbonate | 4 |
| "Gastex" (carbon black) | 60 |
| Stearic acid | 1 |
| Ethyl ether of a distillate from cashew nut shell liquid, said distillate being essentially a phenol having an unsaturated hydrocarbon substituent of more than 13 carbon atoms | 10 |

*Example 2*

A mixture was made up in the manner of that of Example 1 as follows:

| | Parts |
|---|---|
| "Neoprene GRM" | 100 |
| "Neozone D" | 2 |
| Zinc oxide | 5 |
| Magnesium carbonate | 4 |
| "Gastex" | 60 |
| Stearic acid | 1 |
| Ethyl ether of a distillate from cashew nut shell liquid, said distillate being essentially a phenol having an unsaturated hydrocarbon substituent of more than 13 carbon atoms | 20 |

*Example 3*

A further mixture similarly made up, has the following composition:

| | Parts |
|---|---|
| "Neoprene" type G | 150 |
| Magnesia | 8 |
| "Gastex" | 56 |
| Zinc oxide | 10 |
| A product having a viscosity of about 50,000–100,000 centipoises and obtained by heating amyl ethers of cashew nut shell liquid | 50 |

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim and desire to protect with Letters Patent is:

1. A composition of matter comprising polymerized 2-chlor butadiene and a plasticizer therefor said plasticizer selected from the group consisting of hydrocarbon ethers of anacardic material and the heat thickened products of said ethers, said anacardic material selected from the group consisting of cashew nut shell liquid and distillates of cashew nut shell liquid, the boiling points of said distillates at 10 mm. of mercury pressure being approximately 225° C.

2. A composition of matter comprising polymerized 2-chlor butadiene and a hydrocarbon ether of cashew nut shell liquid, the ratio by weight of said polymerized 2-chlor butadiene to said ether being between about 100 to 5 and 100 to 100.

3. A composition of matter comprising polymerized 2-chlor butadiene and a hydrocarbon ether of a distillate of cashew nut shell liquid, the boiling point of said distillate at 10 mm. of mercury pressure being approximately 225° C., the ratio by weight of said polymerized 2-chlor butadiene to said ether being between 100 to 5 and 100 to 100.

4. The method comprising milling a composition comprising polymerized 2-chlor butadiene and a plasticizer therefor said plasticizer selected from the group consisting of hydrocarbon ethers of anacardic material and the heat thickened products of said ethers, said anacardic material selected from the group consisting of cashew nut shell liquid and distillates of cashew nut shell liquid, the boiling points of said distillates at 10 mm. of mercury pressure being approximately 225° C.

5. The method comprising milling a composition comprising polymerized 2-chlor butadiene and a hydrocarbon ether of cashew nut shell liquid, the ratio by weight of said polymerized 2-chlor butadiene to said ether being between about 100 to 5 and 100 to 100.

6. The method comprising milling a composition comprising polymerized 2-chlor butadiene and a hydrocarbon ether of a distillate of cashew nut shell liquid the boiling point of said distillate at 10 mm. of mercury pressure being approximately 225° C., the ratio by weight of said polymerized 2-chlor butadiene to said ether being between 100 to 5 and 100 to 100.

MORTIMER T. HARVEY.